(12) United States Patent
Hall et al.

(10) Patent No.: US 7,948,395 B2
(45) Date of Patent: May 24, 2011

(54) DOWNHOLE TRANSMISSION SYSTEM COMPRISING A COAXIAL CAPACITOR

(75) Inventors: David R. Hall, Provo, UT (US); David S. Pixton, Lehi, UT (US); Monte L. Johnson, Orem, UT (US); David B. Bartholomew, Springville, UT (US); H. Tracy Hall, Jr., Provo, UT (US); Michael Rawle, Springville, UT (US)

(73) Assignee: IntelliServ, LLC, Houston, TX (US)

( * ) Notice: Subject to any disclaimer, the term of this patent is extended or adjusted under 35 U.S.C. 154(b) by 996 days.

(21) Appl. No.: 11/626,070

(22) Filed: Jan. 23, 2007

(65) Prior Publication Data
US 2007/0126596 A1    Jun. 7, 2007

Related U.S. Application Data

(62) Division of application No. 10/878,242, filed on Jun. 28, 2004, now abandoned.

(51) Int. Cl.
*G01V 3/00* (2006.01)

(52) U.S. Cl. ............... 340/854.9; 340/854.3; 340/853.1; 307/89; 307/90; 307/104; 324/323; 324/351; 324/353

(58) Field of Classification Search ............... 340/853.1, 340/854.3, 854.9; 324/323, 351, 353; 307/89, 307/90, 104
See application file for complete search history.

(56) References Cited

U.S. PATENT DOCUMENTS

| | | | | |
|---|---|---|---|---|
| 5,276,415 A * | 1/1994 | Lewandowski et al. | ...... | 333/260 |
| 5,302,138 A * | 4/1994 | Shields | ........................ | 439/527 |
| 5,375,476 A * | 12/1994 | Gray | ........................ | 73/862.331 |
| 6,392,317 B1 * | 5/2002 | Hall et al. | ........................ | 307/90 |
| 6,717,501 B2 * | 4/2004 | Hall et al. | ..................... | 336/132 |
| 6,734,689 B1 * | 5/2004 | Yang | ........................ | 324/755.02 |
| 6,766,185 B2 * | 7/2004 | Scott | ............................. | 600/410 |
| 6,798,310 B2 * | 9/2004 | Wong et al. | ................. | 333/24 C |
| 7,677,439 B2 * | 3/2010 | Zierolf | ........................... | 235/375 |
| 2002/0193004 A1 * | 12/2002 | Boyle et al. | ................... | 439/577 |
| 2004/0112640 A1 * | 6/2004 | Hay et al. | ........................ | 175/26 |
| 2005/0285754 A1 * | 12/2005 | Hall et al. | ................. | 340/855.1 |
| 2007/0005519 A1 * | 1/2007 | Gupta | ........................... | 705/412 |

* cited by examiner

*Primary Examiner* — Albert K Wong
*Assistant Examiner* — Amine Benlagsir
(74) *Attorney, Agent, or Firm* — Victor Segura; Daniel P. Nelson

(57) ABSTRACT

A transmission system in a downhole component comprises a plurality of data transmission elements. A coaxial cable having an inner conductor and an outer conductor is disposed within a passage in the downhole component such that at least one capacitor is disposed in the passage and having a first terminal coupled to the inner conductor and a second terminal coupled to the outer conductor. Preferably the transmission element comprises an electrically conducting coil. Preferably, within the passage a connector is adapted to electrically connect the inner conductor of the coaxial cable and the lead wire. The coaxial capacitor may be disposed between and in electrically communication with the connector and the passage. In another embodiment a connector is adapted to electrical connect a first and a second portion of the inner conductor of the coaxial cable and a coaxial capacitor is in electrical communication with the connector and the passage.

18 Claims, 19 Drawing Sheets

DOWNHOLE TRANSMISSION SYSTEM COMPRISING A COAXIAL CAPACITOR

CROSS REFERENCE TO RELATED APPLICATIONS

This application is a divisional of U.S. patent application Ser. No. 10/878,242 which was filed on Jun. 28, 2004 now abandoned and entitled Downhole Transmission system comprising a coaxial capacitor. U.S. patent application Ser. No. 10/878,242 is now pending.

FEDERAL SPONSORSHIP

This invention was made with government support under contract number No. DE-FC26-01 NT41229 awarded by the Department of Energy. The government has certain rights in this invention.

BACKGROUND

This invention relates to transmission systems in downhole components, more specifically to transmission systems comprising capacitors. U.S. Pat. No. 6,670,880, which is herein incorporated by reference, discloses a downhole transmission system through a string of downhole components. A first transmission element is located in one end of each downhole component, which includes a first magnetically-conductive, electrically-insulating trough, and a first electrically conductive coil lying therein. A second data transmission element is located in the other end, with a similar arrangement comprising a second magnetically-conductive, electrically-insulating trough and a second electrically conductive coil. The transmission system further comprises an electrical conductor in electrical communication with and running between each first and second coil in the downhole component. The string of downhole components is cooperatively arranged such that the components are in magnetic communication with each other and transmit signals through induction. Each downhole component comprises electrical characteristics such as impedance, reactance, capacitance and inductance.

Downhole tool strings may comprise components of different lengths. Some components are tools and others may be pipes. Depending on the function of the components, the length may vary. Many of the electrical characteristics of the component are dependent on the physical dimensions of the electrical conductor connecting the transmission elements, such as length and diameter. Impedance reflections may create noise between two conductors of different impedances, which result in signal loss and attenuation.

U.S. Pat. No. 2,414,719 assigned to Cloud, discloses a conduit for transmitting both fluids and pulsating electrical energy. The conduit comprises a plurality of pipe sections joined at each end, an insulated conductor extending along the conduit, and magnetic coupling means at a joint between two of the pipes for transmitting the electrical energy across the joint. The conduit further comprises a condenser and in one aspect a coil in the magnetic coupling means. The condenser, coil, and insulated conductor produce a circuit which passes only a selected band of frequencies whereby extraneous noises will not be transmitted along the conductor. FIGS. 8 and 9 of the '719 patent show a box comprising a condenser attached to a terminal of a coil, while another terminal connects the condenser to armored cable. The armored cable is attached to the box by fasteners. In this specification the term capacitor and condenser are considered equivalent.

U.S. Pat. No. 6,587,054 discloses an electrical submersible pump cable having an integral capacitor. The electrical submersible pump cable has a primary conductor with an insulator surrounding the primary conductor. A coaxial conductive layer surrounds the insulator, wherein the insulator serves as a dielectric between the primary conductor and the coaxial conductive layer. The coaxial conductive layer and primary conductor enable the coupling of data information onto and off of the cable.

U.S. Pat. No. 3,753,294 discloses a method and an apparatus, wherein the distributed capacitance between a conductor and the outer metallic armor of a cable is measured to enable a determination of the instantaneous changes in position of a tool supported by an elastic cable in a borehole. The correction calculated from the capacitance measurement is used to correct cable length measurements derived from a measure wheel which engages and rotates with movement of the cable.

It should be noted that the term "magnetically-conducting, electrically-insulating material" will be referred to in the rest of the specification as MCEI material.

SUMMARY OF THE INVENTION

This invention is a transmission system for a string downhole components, including drill pipe and tools that make up a drill string. The transmission system comprises a plurality of data transmission elements joined by one or more coaxial cables, each having a dielectric material intermediate an inner conductor and an outer conductor. The transmission system further comprises at least one capacitor in communication with at least one of the coaxial cables. The one or more coaxial cables are disposed within a passage in the downhole component. At least one capacitor is also disposed in at least one of the passages of the downhole component, having a first terminal coupled to the inner conductor and a second terminal coupled to the outer conductor the coaxial cable.

An embodiment of the present invention comprises a coaxial capacitor.

In one embodiment of the present invention, the passage is formed in at least a portion of a wall of the downhole component.

In another embodiment of the present invention, the passage is a metal conduit at least partially disposed within the passage formed in at least a portion of the wall of the downhole component.

In one embodiment of the present invention, the capacitor displaces a portion of dielectric material of the coaxial cable.

In another embodiment of the present invention, the capacitor is disposed between the outside wall of the metal conduit and inside wall of the passage formed in the wall of the downhole component.

Each data transmission element comprises an electrically conducting coil having a lead wire. A connector is adapted to electrically connect the inner conductor and the lead wire. In another embodiment, the capacitor is disposed between and in electrical communication with the connector and the passage.

In a preferred embodiment of the invention, the transmission system comprises an inductive coupler. The inductive coupler may house the electrical conducting coil of magnetically-conducting, electrically-insulating material. Preferably, the magnetically-conducting, electrically-insulating material is ferrite or a laminate of conductor and insulators. In some embodiments of the present invention the data transmission elements comprise direct electrical couplers and in other embodiments of the invention, the transmission elements comprise inductive couplers. The transmission element comprises an anti-rotation device. The transmission system may comprise a sealing assembly. Preferably the sealing assembly is axially mounted around the lead wire.

In the preferred embodiment the downhole component forms a part of a downhole tool string, or drill string. In other aspects of the invention, the downhole tool string is part of a production well. The downhole component may be a downhole tool, including a drill pipe.

In an embodiment of the invention, the coaxial connector is comprised of one or more sections comprising at least one electrically conducting spacers in electrical communication with the passage.

In another embodiment, the transmission system comprises first and second transmission elements connected by a coaxial cable comprising first and second portions of an inner conductor. The first and second portions of the inner conductor are respectively in electrical communication with first and second transmission elements. A connector is adapted to electrically connect the first and second portions of the inner conductor, and a coaxial capacitor is disposed between and in electrical communication with the connector and the passage.

It is believed that downhole components of different lengths may produce different impedances, which result in impedance reflections during signal transmission. It is believed that the reflections result in signal loss and attenuation. It is believed that the advantage of a coaxial capacitor in the transmission system may help match impedances of downhole components of different lengths.

DETAILED DESCRIPTION OF THE PREFERRED EMBODIMENTS

The disclosed description is meant to illustrate the present invention and not limit its scope. Other embodiments of the present invention are possible within scope and spirit of the claims.

Figure 1:
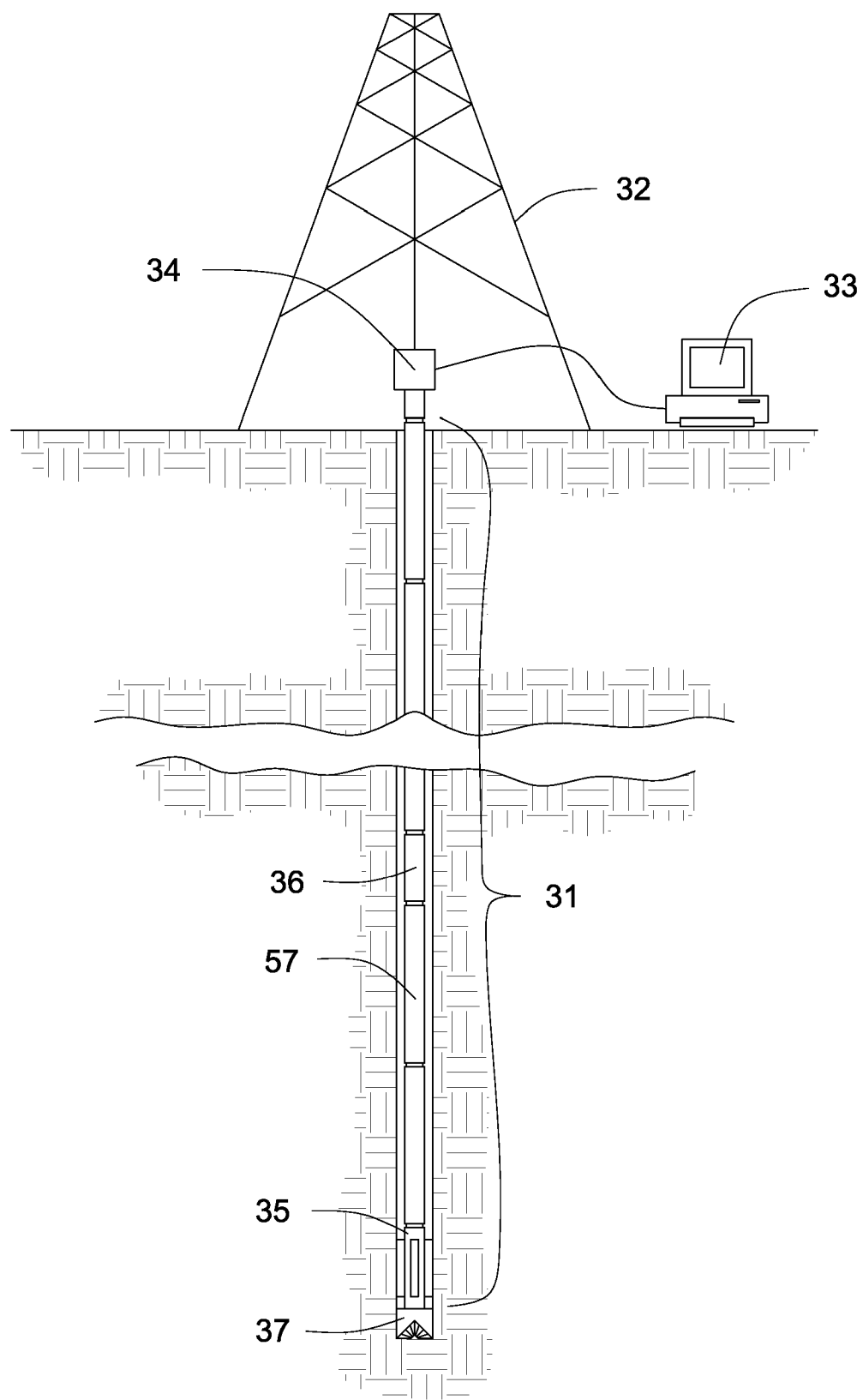
FIG. 1 is a schematic view of a downhole tool string.

FIG. 1 shows an embodiment of a downhole tool string 31 suspended in a well bore by a derrick 32. Surface equipment 33, such as a computer, connects to a data swivel 34. The data swivel 34 is adapted to transmit data to and from an integrated transmission network while the downhole tool string 31 is rotating. The integrated transmission network comprises the transmission systems of the individual components 35, 36, 57 of the downhole tool string 31. Preferably the downhole component is a drill pipe 57 or a tool 35. Tools 35 may be located in the bottom hole assembly 37 or along the length of the downhole tool string 31. Examples of tools 35 on a bottom hole assembly 37 comprise sensors, drill bits, motors, hammers, and steering elements. Examples of tools 35 located along the downhole tool string 31 are links, jars, seismic sources, seismic receivers, sensors, and other tools that aid in the operations of the downhole tool string 31. Different sensors are useful downhole such as pressure sensors, temperature sensors, inclinometers, thermocouples, accelerometers, and imaging devices. Preferably the downhole tool string 31 is a drill string. In other embodiments the downhole tool string 31 is part of a production well.

Figure 2:
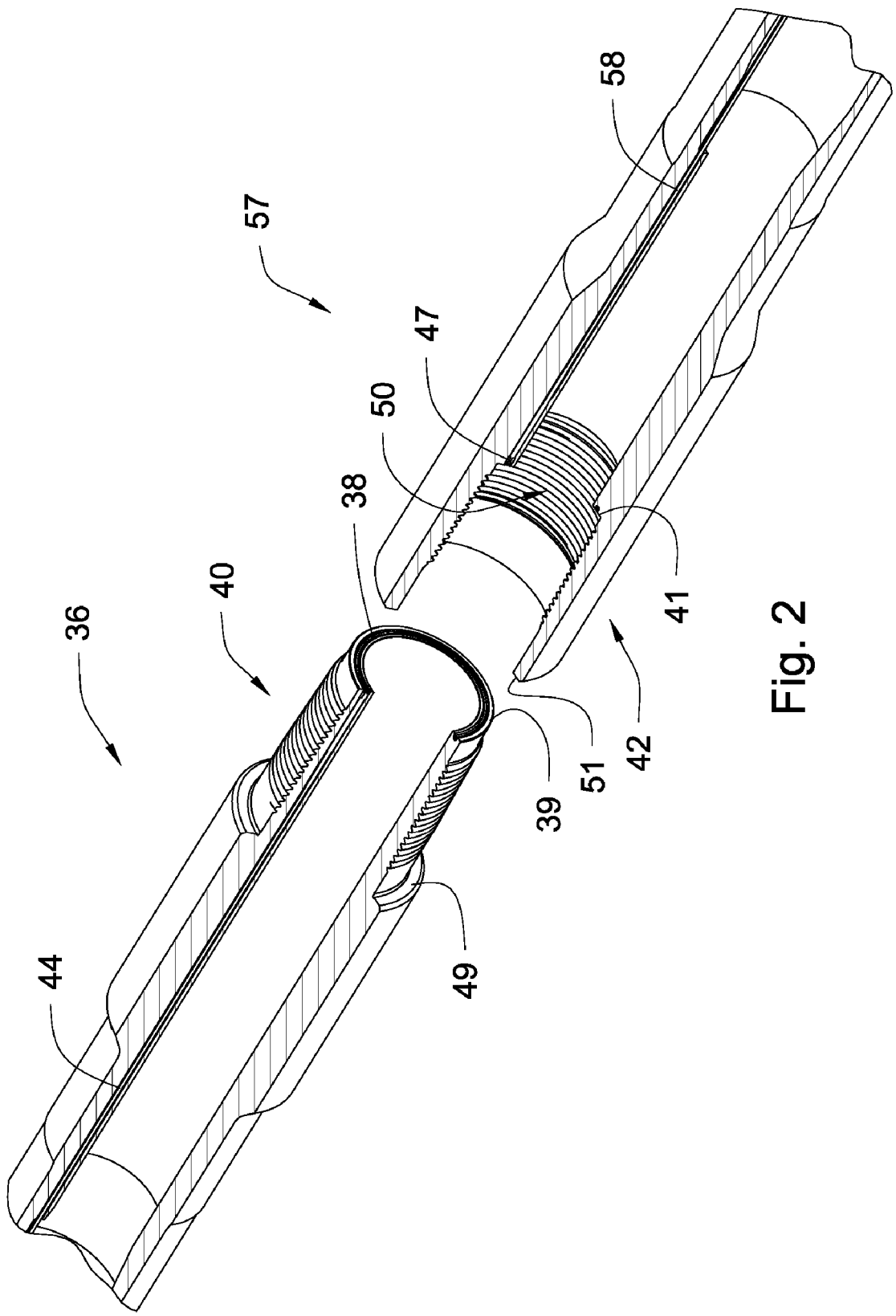
FIG. 2 is a perspective cross section of an embodiment of downhole components.

The downhole tool string 31 is made up of tool joint components, as shown in FIG. 2. The components comprise data transmission elements 38 located in the secondary shoulder 39 of pin end 40 and in the secondary shoulder 41 of the box end 42 of component 57. The transmission elements 38 comprise a segmented circular trough of magnetically-conductive, electrically-insulating material (shown in FIG. 3), which is disposed in an annular groove formed in the secondary shoulders 39, 41. Alternatively, the transmission elements may be a magnetizable element comprising a multi-laminar body. The segments of the multi-laminar body are separated by an electrical insulator and form a trough in which the electrical conductor is disposed. The magnetizable element may be constructed out of a highly permeable and ductile material typically associated with the class of soft magnetic materials.

Figure 3:
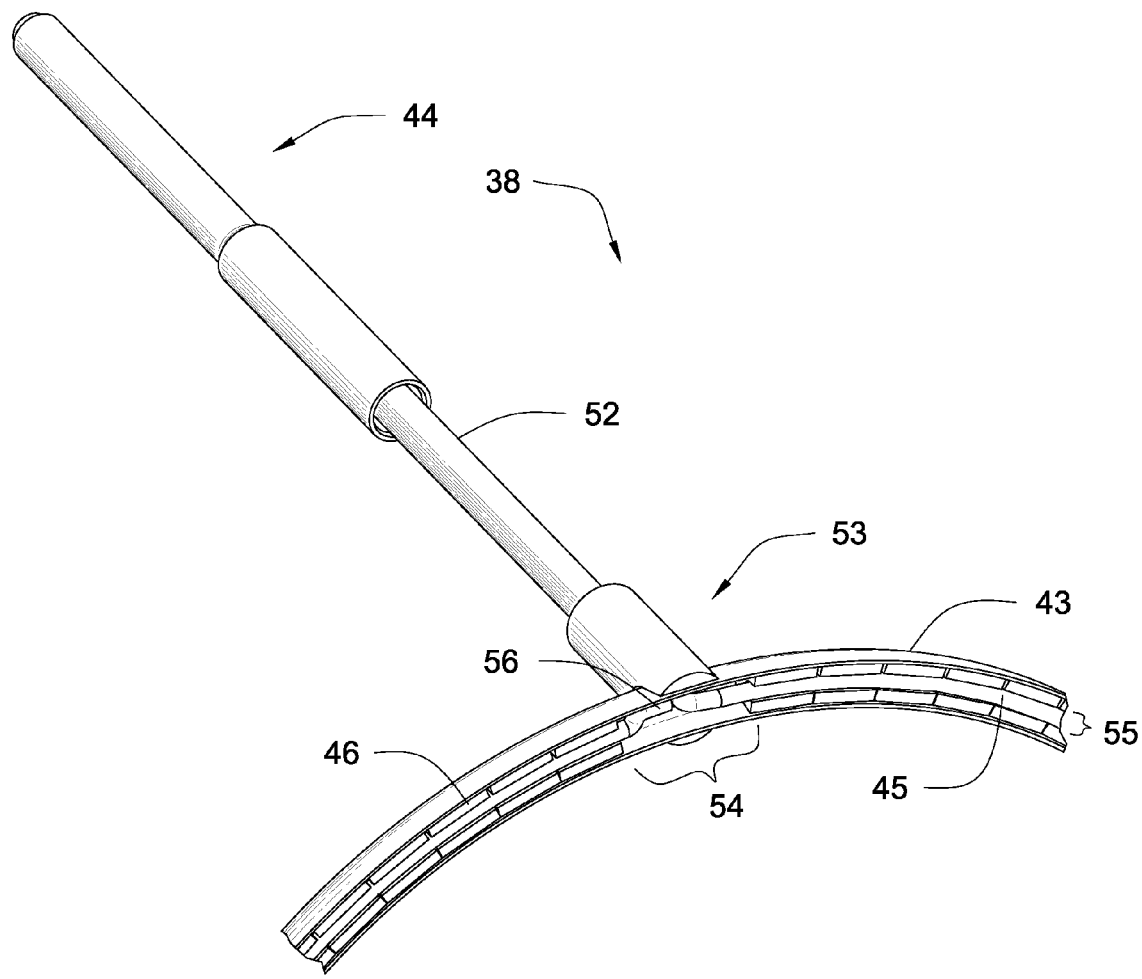
FIG. 3 is a perspective view of section of a transmission element according to an embodiment of the present invention.

The annular groove may be formed by a metal ring 43, as shown in FIG. 3. Preferably, the metal ring 43 is made of steel. In other embodiment the metal ring 43 is made of stainless steel. The data transmission elements 38 are connected by an electrical conductor. In the preferred embodiment, the electrical conductor is a coaxial cable 44.

The transmission elements 38 comprise an inductive coupler. As shown in FIG. 3, the inductive coupler houses an electrically conductive coil 45 embedded in the MCEI circular trough 46. Preferably the MCEI trough 46 comprises is ferrite. In other embodiments the MCEI trough 46 comprises soft iron, nickel iron alloys, silicon iron alloys, cobalt iron alloys or mu-metals. The coil 45 comprises at least one loop of insulated wire. The wire may be made of copper and is insulated with varnish, enamel, or a polymer. When the components of the downhole tool string 31 are made up, or assembled into a string, the transmission elements 38 and 47 line up adjacent to each other and allow data transmission between components 36 and 57. In other embodiments of the present invention the transmission elements 38 comprises a direct electrical coupler or a capacitive coupler. A threaded portion 48 located between the primary shoulder 49 and secondary shoulder 39 of the pin end 40 and a threaded portion 50 located between the primary shoulder 51 and secondary shoulder 41 of the box end 42 provide a means of attachment for the downhole components 36 and 57.

FIG. 3 shows an embodiment of a connection between the coaxial cable 44 and the electrical conducting coil 45. In the preferred embodiment, a signal travels along the coaxial cable 44 of a downhole component 36. The signal passes from the coaxial cable 44 to a lead wire 52 of the coil 45. The transmission element 38 comprises an anti-rotation device 53, which keeps the metal ring 43 from rotating about the axis of the lead wire 52. In the preferred embodiment the lead wire 52 enters the metal ring 43 through a hole in the metal ring 43, where there is a void 54 of the MCEI material 46. The coil 45 is housed in a channel 55 formed by the segmented trough of MCEI material 46 and is grounded to the metal ring 43 in the void 54 of the MCEI material 46. Preferably, the grounded portion 56 of the coil 45 is brazed to the metal ring 43. In some embodiments of the present invention the coil 45 and MCEI trough 46 are disposed in a groove formed in secondary shoulders 39, 41 of both the pin end 40 and also in the box end 42 of the downhole component 36.

Preferably, the MCEI circular trough of 46 is held in place within the circular trough, by an electrically-insulating filler material. Preferably the filler material is selected from the group consisting of epoxy, natural rubber, fiberglass, carbon fiber composite, a polymer, polyurethane, silicon, a fluorinated polymer, grease, polytetrafluoroethylene and perfluoroalkoxy, or a combination thereof.

As the signal travels along the coil 45, a magnetic field from the electrical current is produced in the MCEI material 46. The magnetic field influences the MCEI material 46 in the adjacent transmission element 47 in the adjacent downhole component 57. The electrically conducting coils are arranged in a manner to allow the magnetic fields to generate a magnetic transmission circuit. A magnetic transmission circuit may be allowed by disposing one coil in a clockwise direction in the segmented circular trough of magnetically-conductive, electrically-insulating material and disposing an adjacent coil in a counterclockwise direction in an adjacent segmented circular trough of magnetically-conductive, electrically-insulating material. The coil in the adjacent transmission element 47 is influenced by the magnetic transmission circuit to generate an electrical current and that signal is passed to the coaxial cable 58 in the adjacent downhole component 57.

Figure 4:
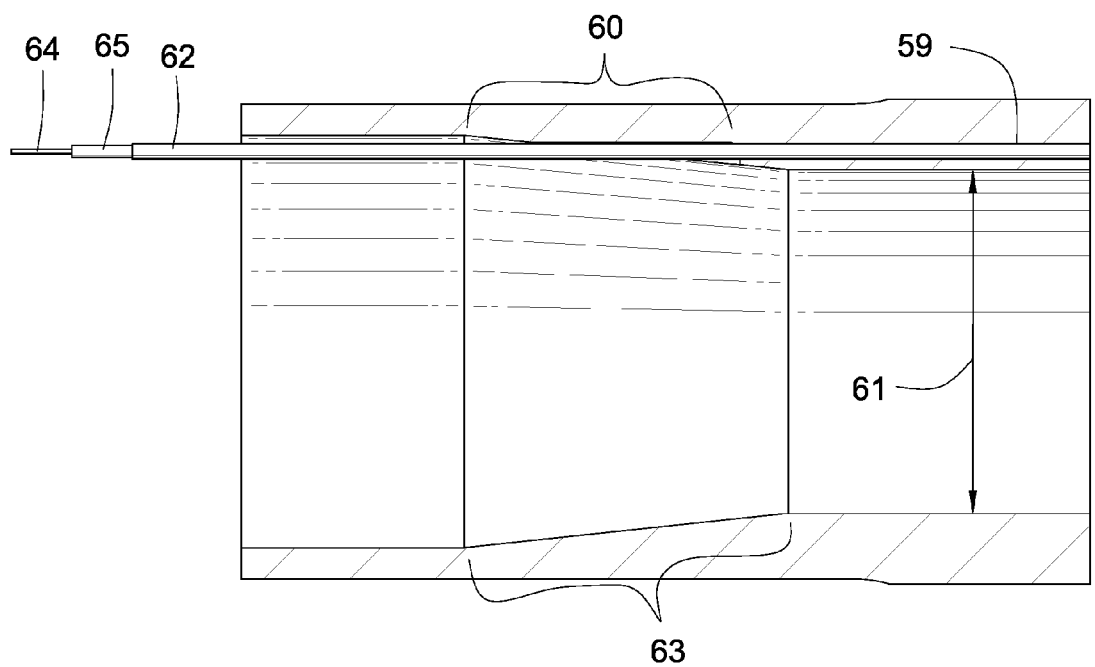
FIG. 4 is a schematic view an embodiment of a downhole component according to an embodiment of the present invention.

In the preferred embodiment as shown in FIG. 4, a passage 59 is formed in the component 36 for the coaxial cable 44 and lead wire 52. The passage 59 runs from the secondary shoulder 39 to an opening 60 in the inner diameter 61 of the downhole component 36. Preferably the passage 59 is a drilled hole. In some aspects of the invention, the passage 59 is a metal liner, such as conduit, which coaxial cable 44 from fluids within the bore of the downhole component 36. FIG. 4 shows an embodiment of the coaxial cable 44 disposed inside the downhole component 36. In the preferred embodiment the inner diameter 61 of the downhole component 61 narrows at the ends of the component 36. The coaxial cable 44 exits the passage 59 through the opening 60 in the region 63 where the inner diameter 61 of the component 36 narrows. Preferably the coaxial cable 44 comprises an inner conductor 64, a dielectric 65, and an outer conductor 62. In some embodiments the outer conductor 62 in insulated. In the preferred embodiment the outer conductor 62 is in electrical communication with the passage 59. In this embodiment the component 36 acts as ground for the coaxial cable 44. In another embodiment, the passage 59 is a metal tube preferably made of conduit 159, which provides protection to the outer conductor 62 of the coaxial cable 44 throughout the length of the downhole component 36.

Figure 5:
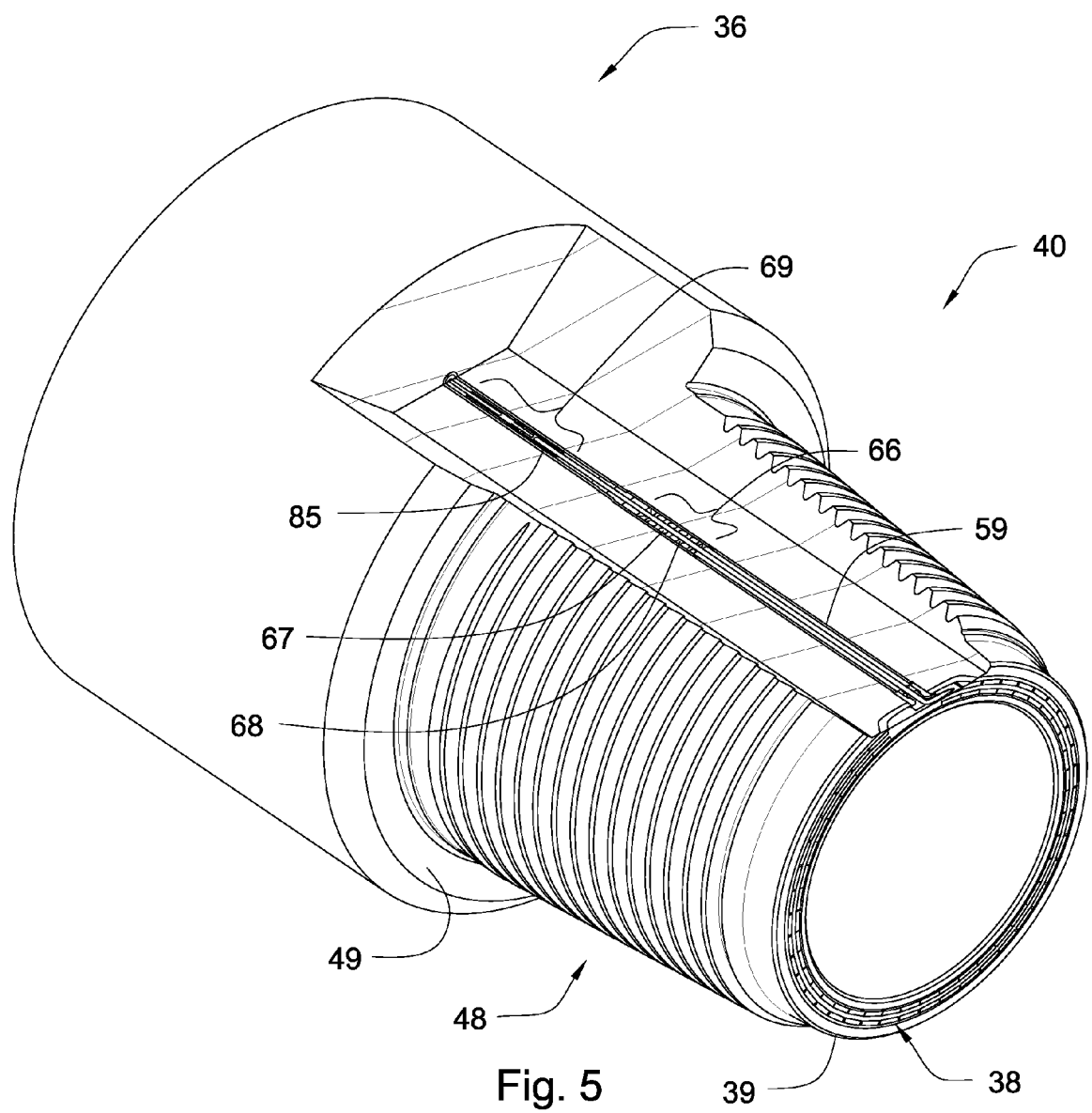
FIG. 5 is a perspective cut-away of an embodiment of a downhole component according to an embodiment of the present invention.

In the preferred embodiment, the transmission element 38 comprises a sealing assembly 66, which protects moisture or other contamination from entering the passage 59. Preferably the sealing assembly 66 is axial mounted around the lead wire 52. A sealing assembly 66 is depicted in FIG. 5. The sealing assembly 66 comprises at least one ring 67 made of a polymer or rubber surrounding the lead wire 62 of the coil 45. Preferably, the sealing assembly 66 has at least four rings 67 and a sealing spacer 68 separating each of those rings 67. Also shown in FIG. 5 is the capacitor assembly 69. In the preferred embodiment the capacitor assembly 69 connects the coaxial cable 44 to the lead wire 52. In other embodiments the capacitor assembly 69 connects a first portion 70 and a second portion 71 of the coaxial cable 44.

Figure 6:
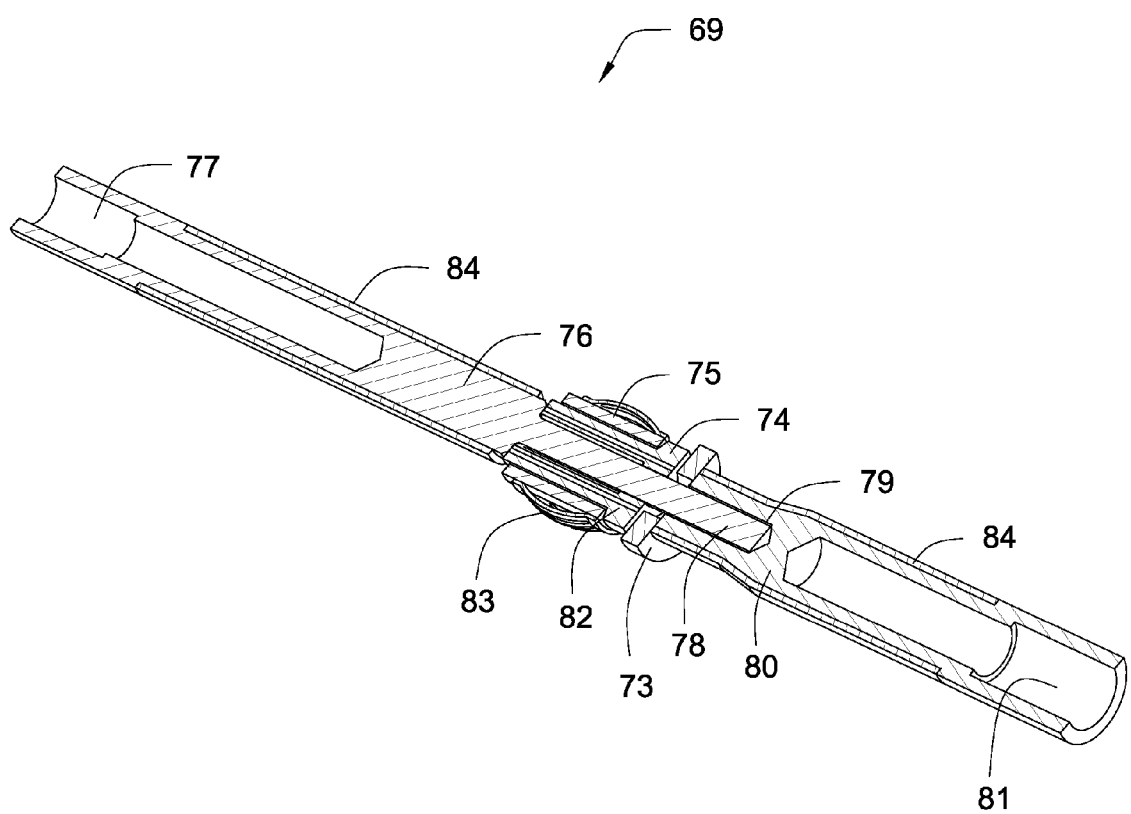
FIG. 6 is a perspective cross section of an embodiment of a capacitor assembly according to an embodiment of the present invention.

FIG. 6 shows the preferred embodiment of the capacitor assembly 69. Preferably, the connector 72 is comprised of at least two sections. In other embodiments the connector 72 comprises a single section. In the preferred embodiment the at least two sections are separated by a coaxial spacer 73. Preferably, the connector 72 is at least partially electrically insulated. Preferably, the capacitor 74 comprises at least one electrically conducting spacer 75 in electrically communication with the passage 59.

The first section 76 comprises a cable receptacle 77 for the inner conductor 64 of the coaxial cable 44. The dielectric 65 and the outer conductor 62 of the coaxial cable 44 surround the first section 76 of the connector 72. The first section 76 of the connector 72 comprises an insert 78 which fits in a middle receptacle 79 of the second section 80 of the connector 72. Preferably, a coaxial capacitor 74 is axial mounted around the insert 78. A coaxial spacer 75 separates the capacitor 74 from the second section 80 of the connector 72. The second section 80 comprises a lead wire receptacle 81. The dielectric 82 of the capacitor 74 runs parallel to the insert 78 and the flow of the electrical current. Preferably an electrically-conducting spacer 75 is soldered to the coaxial capacitor 74.

spring 83 may be soldered to the electrically conducting spacer 75. Preferably the spring 83 is made of brass and is soldered to the electrical conducting spacer 75 at two points to provide a better electrical contact with the electrically conducting spacer 75. The spring 83 physically contacts the outer conductor 62 of the coaxial cable 44. Preferably, the first section 76 and second section 80 of the connector 72 comprises some insulation 84. The second section 80 may be surrounded by an insulating layer 85 (shown in FIG. 5), separating the second section 80 from the outer conductor 62 of the coaxial cable 44. The capacitor 74 needs to be adapted to withstand the harsh downhole environment. The capacitor assembly 69 needs to withstand extreme heat downhole, tension from the weight of the downhole tool string 31, and torque from rotating the downhole tool string 31. A coaxial capacitor, Shoulder Feed-Thru #2463-000-X7UO-152P, is sold by Tusonix, Tucson, Ariz. This capacitor has an operating temperature of −55° to 125° C. A spring, Male Contact Band #192048, is sold by AMP, Inc. Harrisburg, Pa.

In the preferred embodiment of the present invention, a spring 83 provides the electrical communication between the connector 72 and the outer conductor 62 of the coaxial cable 44. The spring 83 is preferred due to the tolerance ranges in the dimension of the passage 59, the coaxial cable 44, capacitor 74, and connector 72. In another embodiment, the capacitor assembly 69 comprises a force fitted capacitor.

The impedance of a coaxial cable 44 is dependant on it's length. A typical component 57 in a downhole tool string 31 is 25 to 90 feet long. More typically, a component 57 in a downhole tool string 31 is 28 to 33 feet long. A matching length of coaxial cable 44 is needed to connect the transmission elements 38, 47 at both ends of the component 57. Signal transmission from one component 57 of a certain impedance to another component 36 of a significantly different impedance are believed to cause impedance reflections. These reflections are believed to cause signal loss and attenuation. Different lengths of coaxial cables between 28 to 33 feet are considered to be insignificant. However, some components 36 of a downhole tool string 31 may only be a couple of feet long and the impedance difference between their respective coaxial cables is significant. It is believed that a capacitor 74 may be selected which may match the impedance of different lengths of coaxial cable within a certain range of frequency. A preferred ranged of frequency for the present invention is 4 MHz to 6.5 MHz, although other frequencies could be used. It is believed that a capacitor 74 may be selected which will match the impedance of different lengths of coaxial cable with the frequency range of 4 MHz to 6.5 MHz and thereby reduce signal attention between downhole components of different lengths. In the preferred embodiment, a capacitor 74 is incorporated into the downhole components 36 that fall outside of the typical component's length.

Changing other characteristics of the coaxial cable 44 may also help to match the impedances of different lengths of coaxial cables, such as changing the size of the diameter, the type of dielectric, and the thickness of the dielectric. Wrapping a longer coaxial cable in the inner diameter 61 of the downhole component 36 may also help to match the impedances of the different length components. The impedance differences between the coaxial cable 44 and the coil 45 need to approximately match, although the coils 45 and coaxial cable 44 act as a circuit, so changing the electrical characteristics of a coil 45 may change the impedance of the overall downhole component 36. Changing the physical characteristics of the coil 45 in the transmission element 38 may help match the impedance of the components 36 of different lengths. One embodiment of the present invention adds loops to the coil 45. In another embodiment the diameter of the coil 45 is increased. In another embodiment the diameter of the coil 45 in decreased.

The capacitor assembly 69 may be assembled to the lead wire 52 first. The transmission elements 38 are placed in the groove formed in the secondary shoulder 39, so that the lead wire 52 may be inserted into the passage 59. The downhole component 36 is arranged such that the capacitor assembly 69 receives the inner conductor 64 of the coaxial cable 44 when the transmission element 38 is positioned in the groove. Preferably, the capacitor assembly 69 is first secured to the coaxial cable 44. In this manufacturing method, a good electrical connection between the first section 76 of the connector 72 and the inner conductor 64 of the coaxial cable 44 may be assured, before the coaxial cable 44 is secured in the component 36. The lead wire 52 may then be received by the lead wire receptacle 81 in the second section 80 of the connector 72 when the transmission element 38 is positioned within the groove of the secondary shoulder 39.

Figure 7:
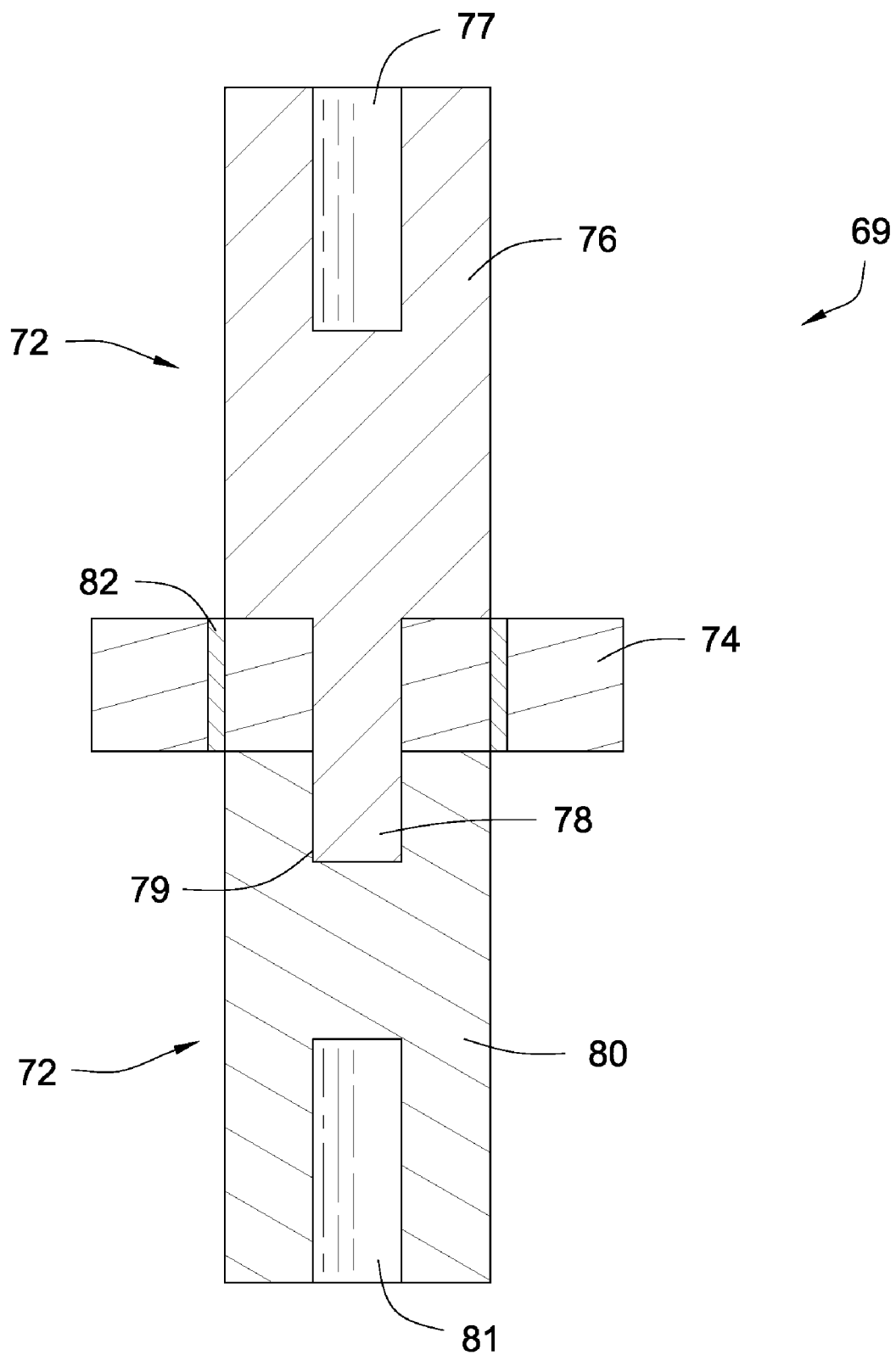
FIG. 7 is a cross section of an embodiment of a capacitor assembly according to an embodiment of the present invention.

FIG. 7 illustrates another embodiment of the capacitor assembly 69. The first section 76 of the connector 72 comprises the cable receptacle 77. The coaxial capacitor 74 is mounted around the insert 78. The insert 78 is also received by the middle receptacle 79 of the second section 80. The capacitor 74 is in electrical communication with both the insert 79 and the outer conductor 62 of the coaxial cable 44.

Figure 8:
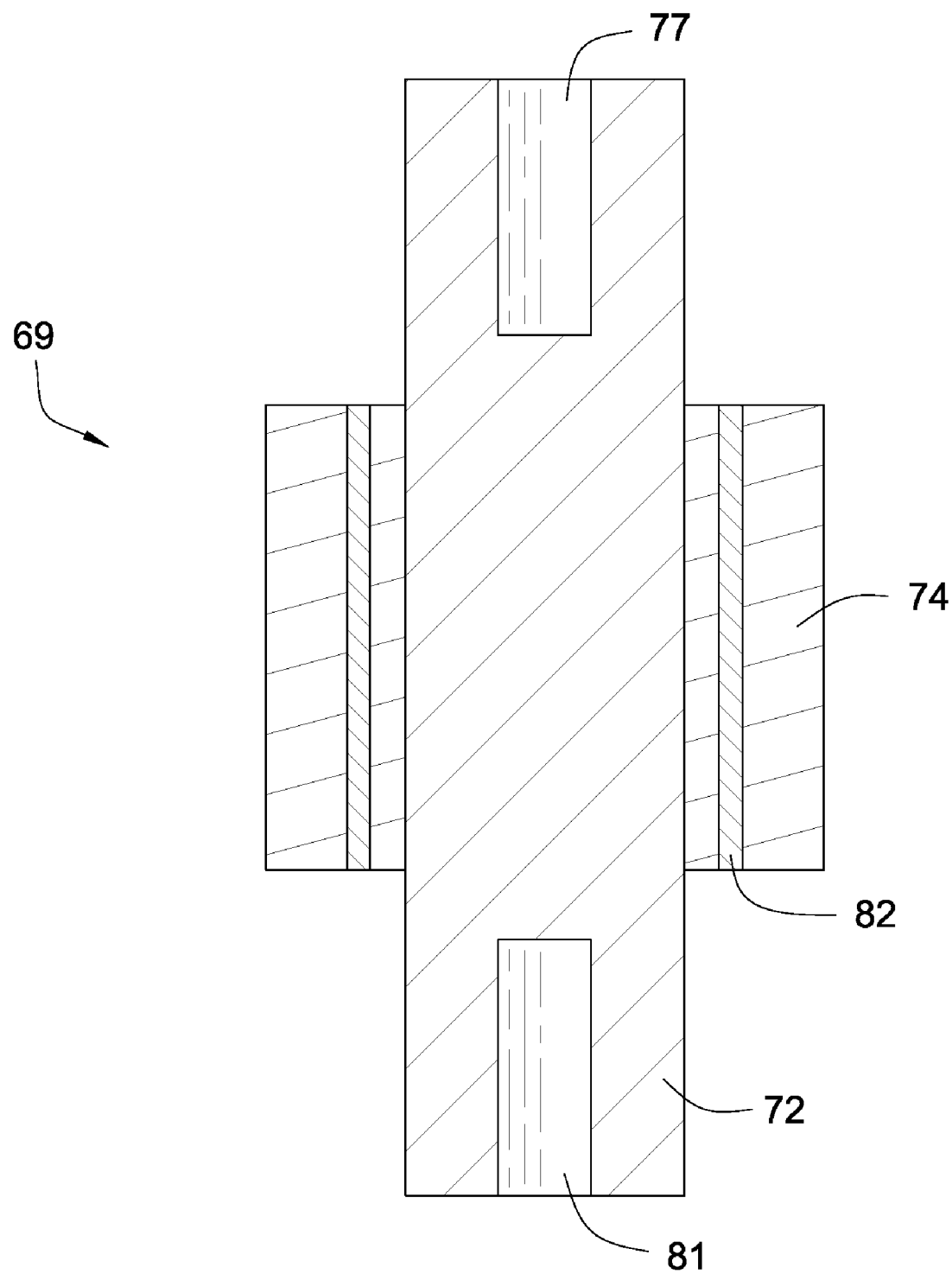
FIG. 8 is a cross section of an embodiment of a capacitor assembly according to an embodiment of the present invention.

FIG. 8 shows an embodiment of the capacitor assembly 69. The connector 72 comprises a single section. The coaxial capacitor 74 makes a direct electrical connection between the connector 72 and the outer conductor 62 of the coaxial cable 44. Also shown is the dielectric 82 represented by a dotted line.

Figure 9:
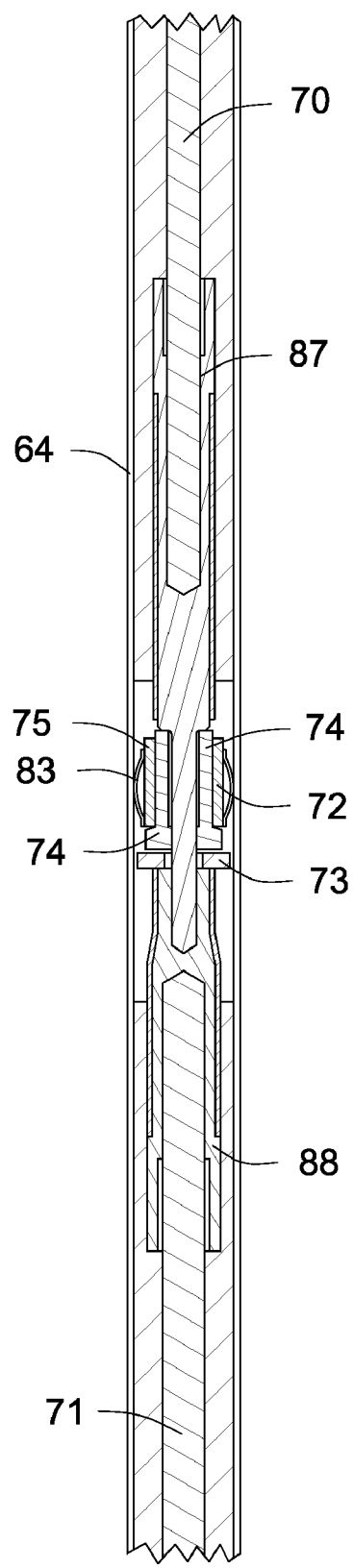
FIG. 9 is a cross section of an embodiment of a capacitor assembly according to an embodiment of the present invention.

FIG. 9 shows a capacitor assembly 69 adapted to connect a first portion 70 and a second portion 71 of the inner conductor 64 of the coaxial cable 44. The coaxial capacitor 74 may be spliced into the coaxial cable 44 before the coaxial cable 44 is secured in the downhole component 36. Preferably the coaxial capacitor 74 is inserted into the coaxial cable 44 during the manufacturing of the coaxial cable 44. The first portion 70 of the inner conductor 64 of the coaxial cable 44 is inserted into a first cable receptacle 87 and the second portion 71 of the inner conductor 64 of the coaxial cable 74 is inserted in a second cable receptacle 88. The brass spring 83 provides electrical communication between the connector 72 and the outer conductor 62 of the coaxial cable 44.

Figure 10:
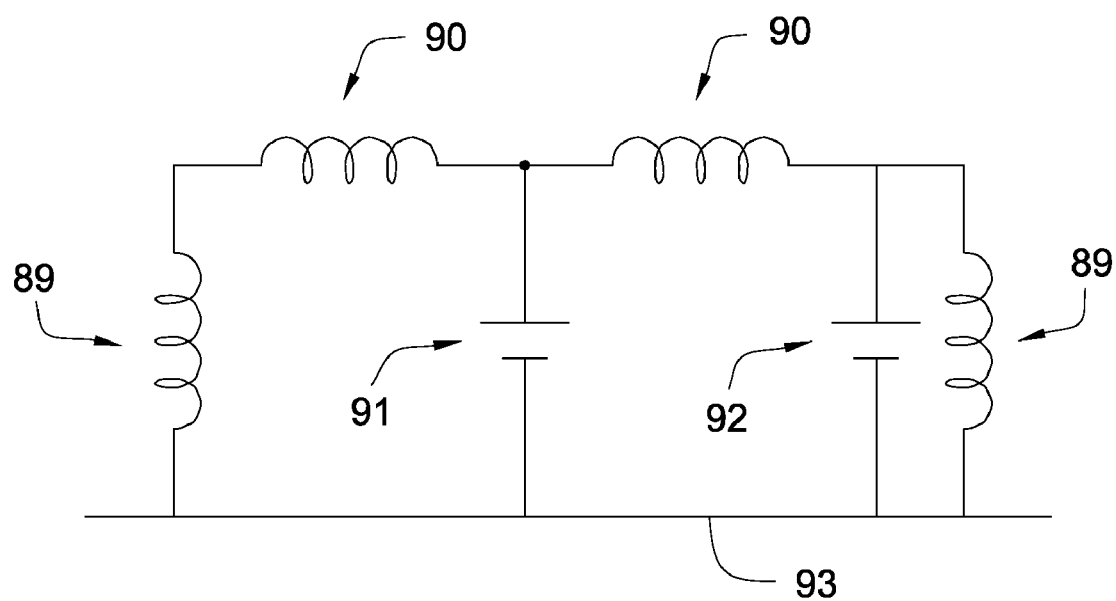
FIG. 10 is an electrical schematic of an embodiment of a downhole component according to an embodiment of the present invention.

FIG. 10 is an electrical schematic of the downhole component 36. The electrical characteristics of the preferred embodiment are a series of inductance and capacitance in parallel. Inductor 89 represents the inductance provided by the transmission elements 38, 41. Inductor 90 represents the inductance of the coaxial cable. Capacitor 91 represents the capacitance of the coaxial cable. Capacitor 92 represents the capacitance provided by the coaxial capacitor. Ground 93 represents ground.

Figure 11:
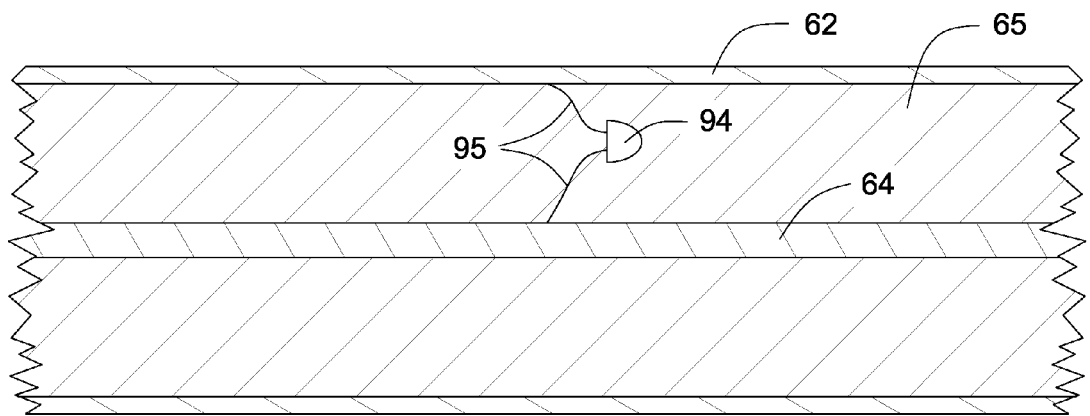
FIG. 11 is a cross section of an embodiment of a capacitor assembly according to an embodiment of the present invention.

FIG. 11 shows an embodiment of a capacitor 94 located in the dielectric 65, which is in electrical communication with the outer conductor 62 and the inner conductor 64. In this embodiment a portion of the dielectric 65 is cut away to make space for the capacitor 94. Preferably terminals 95 are made of wire and are spliced into the outer conductor 62 and inner conductor 64. In some embodiments of the present invention, the terminals 95 are soldered to the outer conductor 62 and the inner conductor 64.

Figure 12:
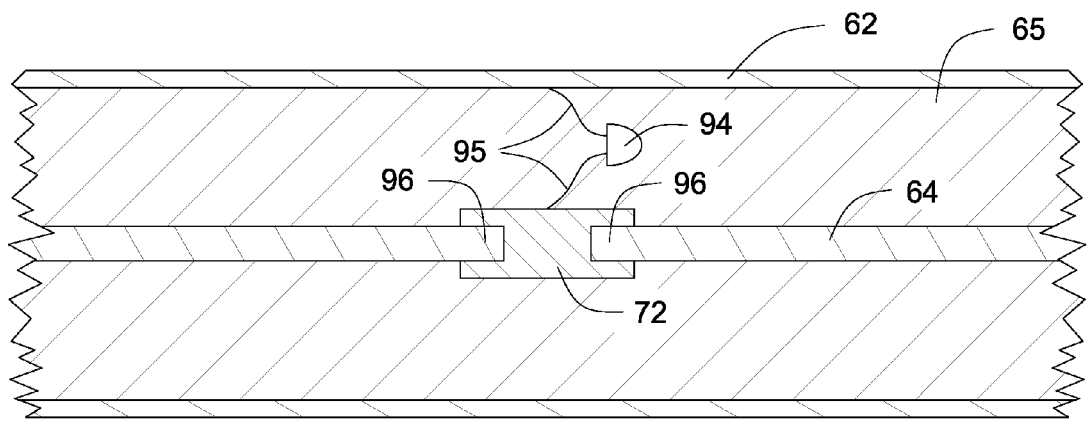
FIG. 12 is a cross section of an embodiment of a capacitor assembly according to an embodiment of the present invention.

FIG. 12 shows an embodiment of a capacitor 94 also located in the dielectric 65. The capacitor 94 is in electrical communication with the outer conductor 62 of the coaxial cable 64 and a connector 72. Preferably, the connector 72 comprises a single section, but in other embodiments it comprises at least two sections 76, 80. The connector 72 has receptacles 96 for either a lead wire 52 or a portion of the inner conductor 64 of the coaxial cable 44.

Figure 13:
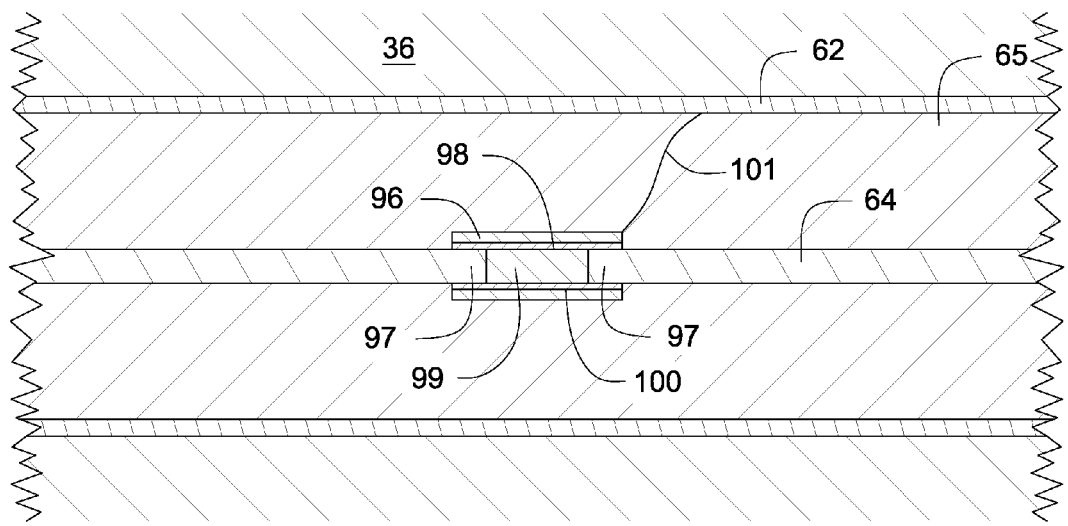
FIG. 13 is a cross section of an embodiment of a capacitor assembly according to an embodiment of the present invention.
Figure 14:
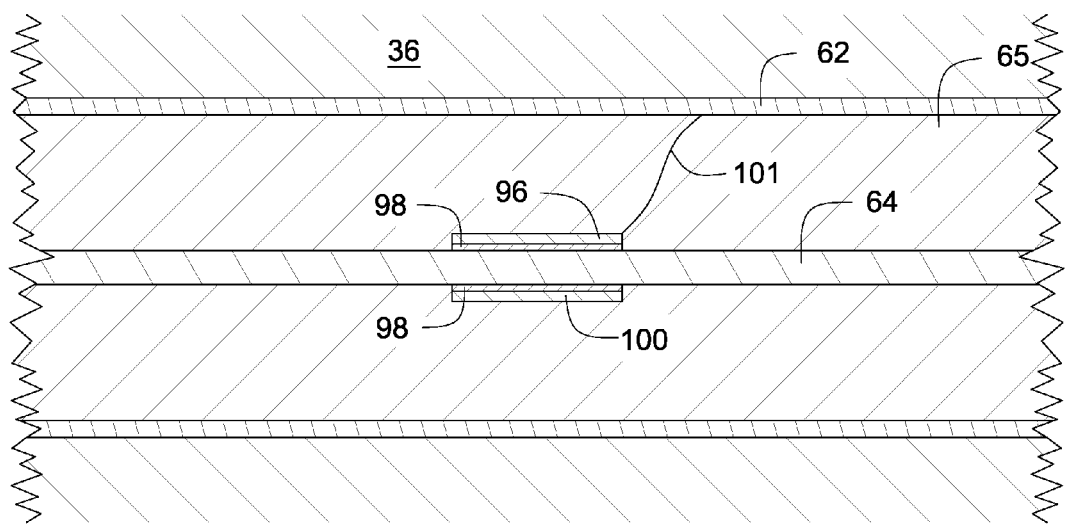
FIG. 14 is a cross section of an embodiment of a capacitor assembly according to an embodiment of the present invention.

FIG. 13 shows an embodiment of a connecting capacitor 96. In this embodiment of the present invention, the connecting capacitor 96 comprises receptacles 97 for either a portion of the coaxial cable 44 or a lead wire 52. A dielectric 98 separates the inner plates 99 of the connecting capacitor 96 from the distal plates 100 in the capacitor 96. In this embodiment one terminal 101, preferably made of a wire, connects the distal plates 100 to the outer conductor 62 of the coaxial cable 44. In other embodiments, the connecting capacitor 96 comprises at least one terminal 101. FIG. 14 shows another embodiment of the connecting capacitor 96, a dielectric 98 simply surrounds the inner conductor 64 of the coaxial cable 44. The dielectric 98 is surrounded by distal plates 100 which are in electrical communication with the outer conductor 62 of the coaxial cable 44. Wire terminals 101 physically connects the outer conductor 64 with the connecting capacitor 96.

Figure 15:
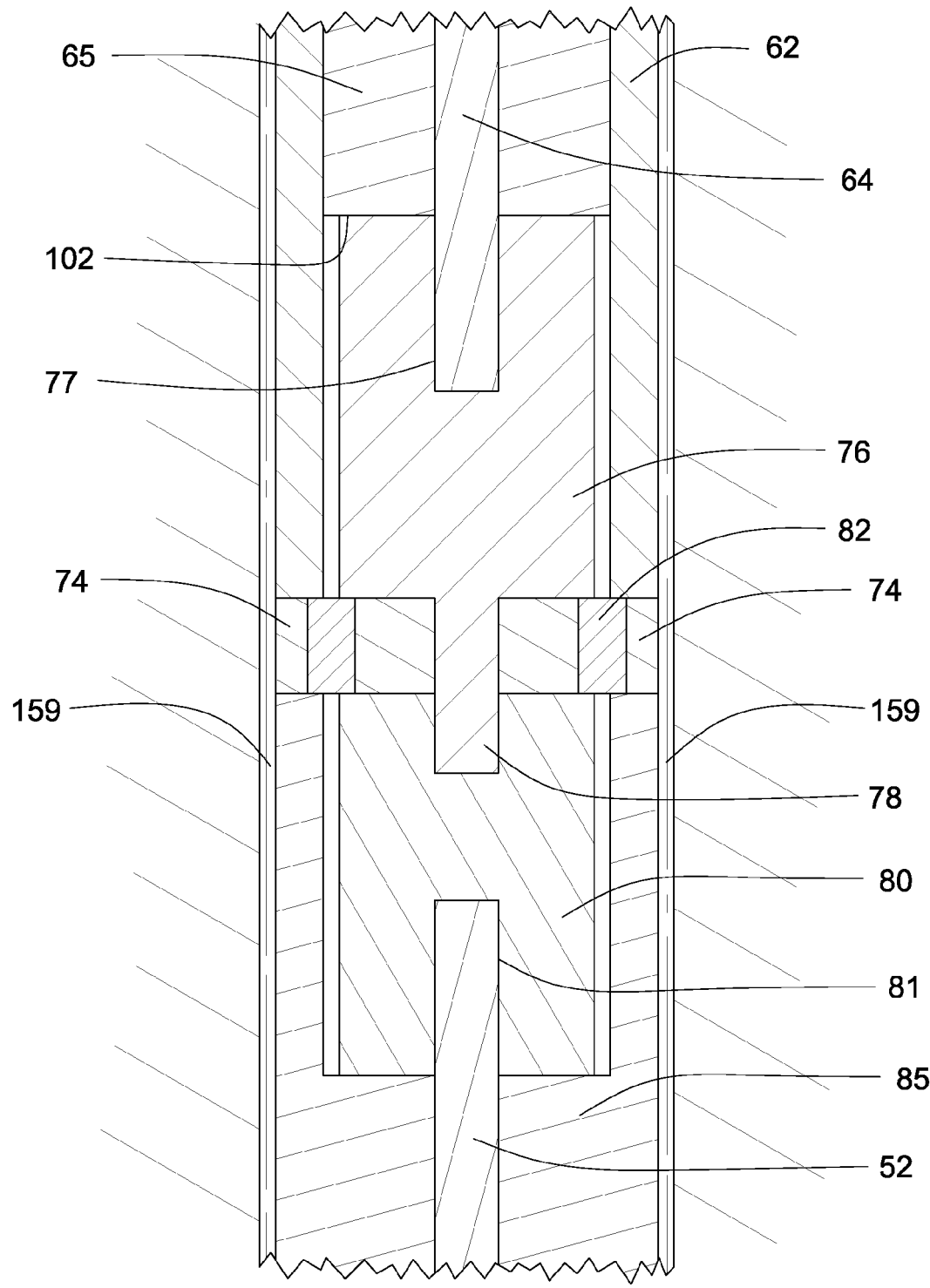
FIG. 15 is a cross section of an embodiment of a capacitor assembly according to an embodiment of the present invention.
Figure 16:
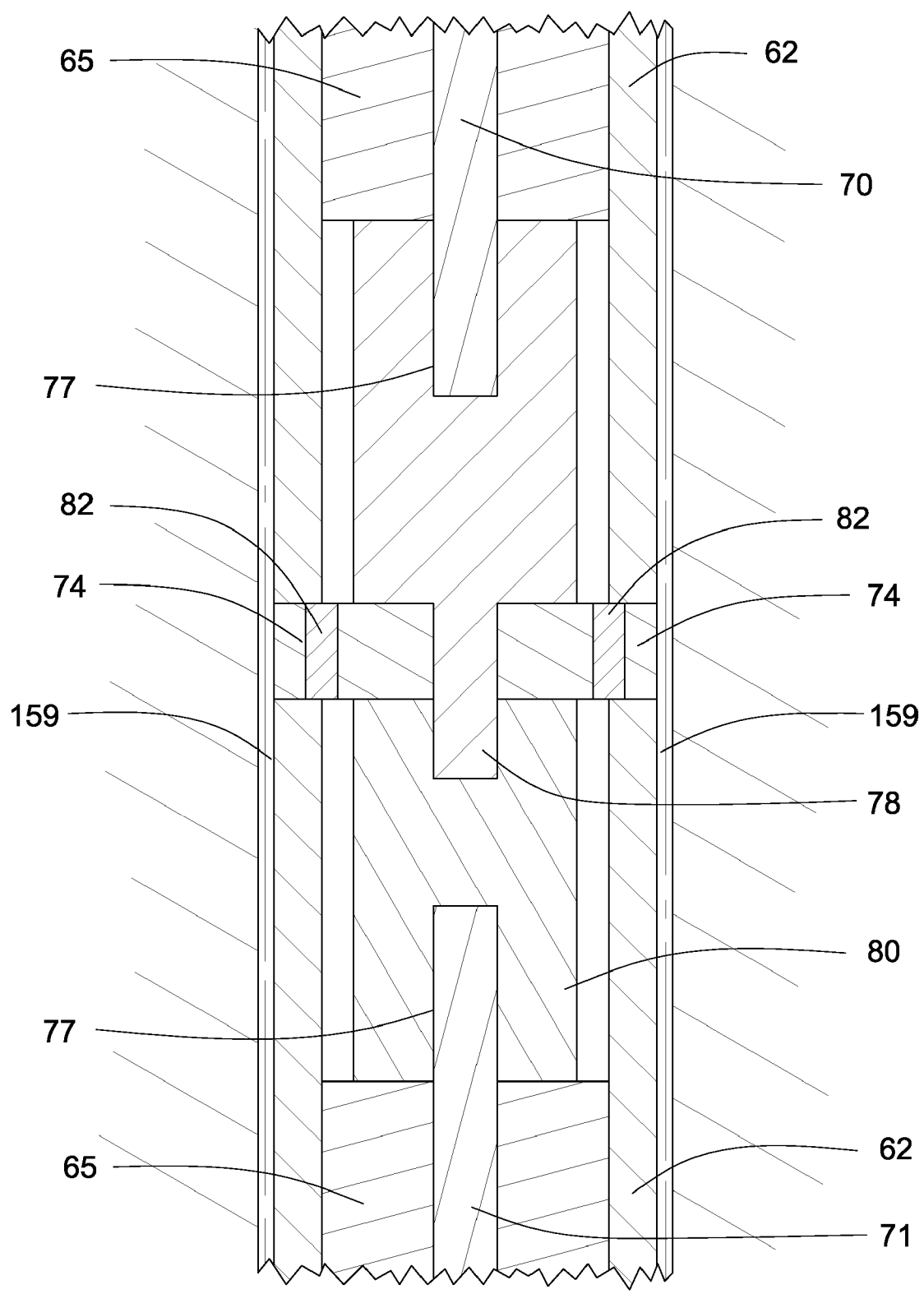
FIG. 16 is a cross section of an embodiment of a capacitor assembly according to an embodiment of the present invention.

FIG. 15 illustrates another embodiment of the capacitor assembly 69. In this embodiment of the present invention, the capacitor 74 makes a direct electrical connection with the passage 59. In another embodiment of this invention the capacitor 74 makes a direct electrical connection with the metal tube. As shown in FIG. 15, the outer conductor 62 and dielectric 65 end at the edge 102 of the first section 76 of the connector 72 and the inner conductor 64 is received in the cable receptacle 77. In FIG. 15, the lead wire receptacle 81 accepts the lead wire 52. The lead wire 52 is preferably further surrounded by electrical insulation 85. In FIG. 16, the second section 80 of the connector 72 comprises a cable receptacle 77 for connecting a first portion 70 and a second portion 71 of the inner conductor 64 of the coaxial cable 44.

Figure 17:
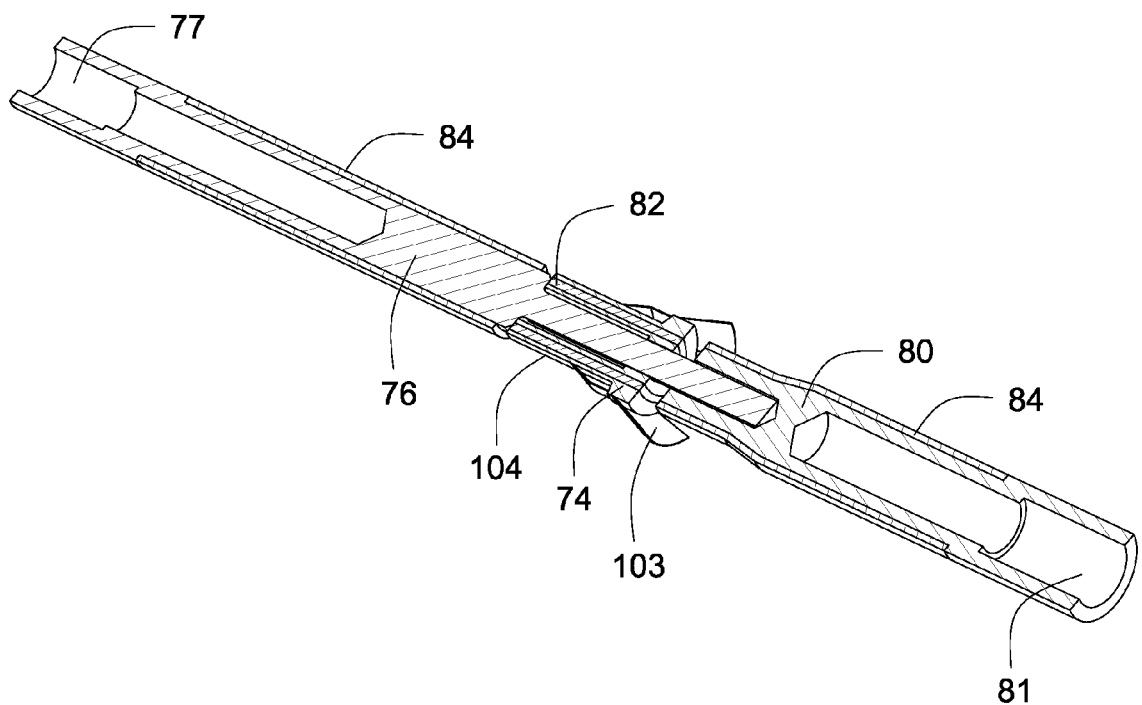
FIG. 17 is a perspective cross section of an embodiment of a capacitor assembly according to an embodiment of the present invention.

FIG. 17 shows another embodiment of the spring 103. The spring 103 may be made of brass and soldered directly to the coaxial capacitor 74. The soldered section 104 of the spring 103 extends distally away from the coaxial capacitor 74 and axially towards the second section 80 of the connector 72. The spring 103 may make direct electrical contact with the passage 59, metal tube, or outer conductor 62 of the coaxial cable 44.

Figure 18:
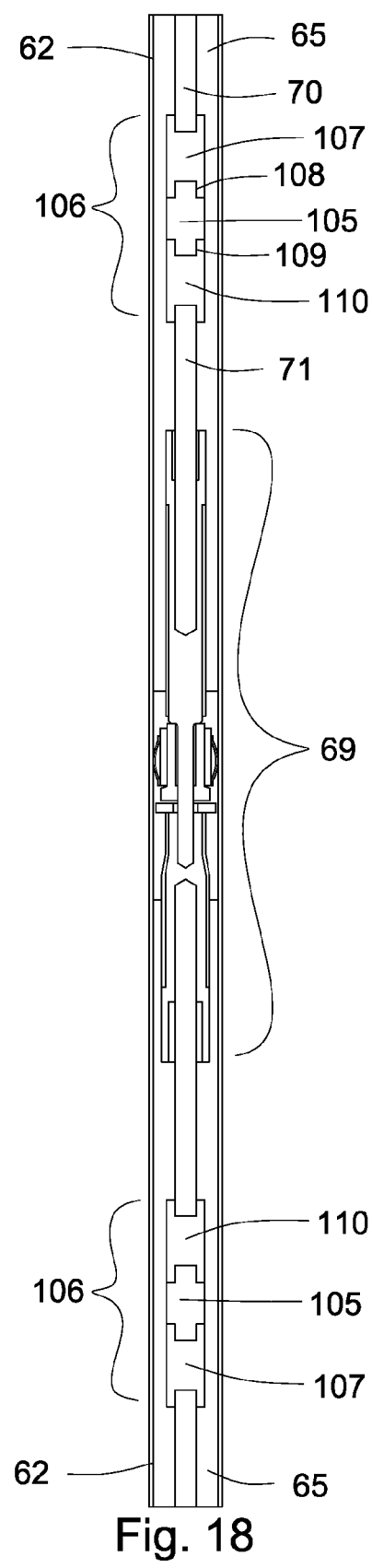
FIG. 18 is a cross section of an embodiment of a capacitor assembly according to an embodiment of the present invention.

In another embodiment of the present invention, in-line inductors 105 are included on either side of the capacitor assembly 69, as shown in FIG. 18. There may be at least one inductor 105 on either side of the capacitor assembly 69. In other embodiments, there is only one in-line inductor 105 in the transmission system of the downhole component 36. The in-line inductor 105 is not in electrical communication with the outer conductor 62 of the coaxial cable 44, the metal tube, or the passage 59. The inductor is not grounded. The inductor assembly 106 comprises a first connector 107 receiving an inner conductor 70 of the coaxial cable 44 into a cable receptacle 108. The first connector 107 also receives an inductor insert 109, which brings the coaxial cable 44 into electrical communication with the inductor 105. A second inductor connector 110 connects the inductor 105 to a second portion 71 of the inner conductor 64 of the coaxial cable 44. The second portion 71 of the inner conductor 64 of the coaxial cable 44 is received by the capacitor assembly 69. It is believed that the inductors 105 may contribute to matching the impedances of different lengths of coaxial cables 44.

Figure 19:
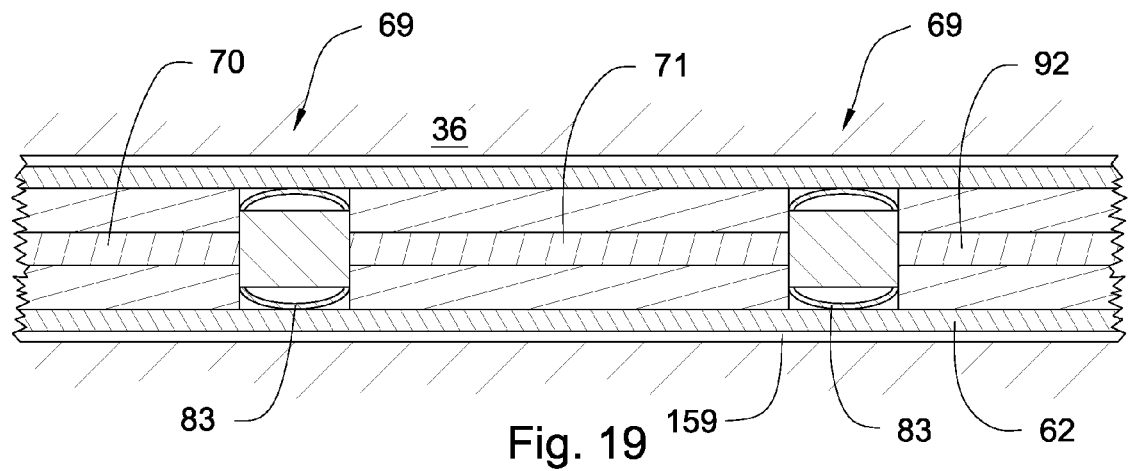
FIG. 19 is an orthogonal view of an embodiment of multiple capacitors according to an embodiment of the present invention.
Figure 20:
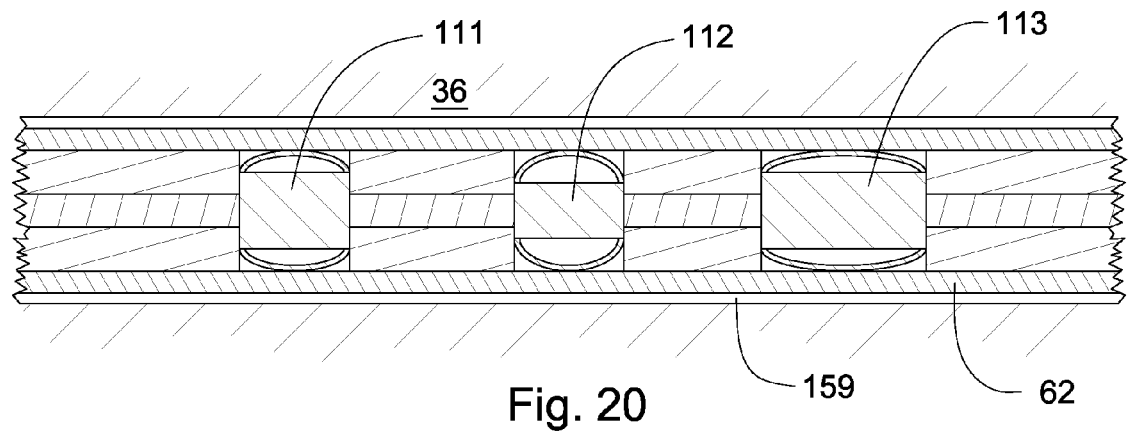
FIG. 20 is an orthogonal view of an embodiment of multiple capacitors according to an embodiment of the present invention.

Multiple capacitors may be disposed in the transmission system in the downhole component 36. FIG. 19 shows two capacitor assemblies 69. One capacitor assembly connects a first portion 70 and a second portion 71 of a coaxial cable 44. The other capacitor assembly connects the second portion 71 of the coaxial cable 44 to the lead wire 52 of the coil 45 in the transmission element 38. Another embodiment of the present invention comprises more than one capacitor assembly 69 disposed along the coaxial cable 44. In some embodiments of the present invention, the capacitors may vary in their capacitance, as shown in FIG. 20. The capacitance of capacitors 111, 112, 113 is directly related to their physical dimensions. The capacitor 111 has a thicker diameter than capacitor 112. Capacitor 113 is longer than both capacitors 111, 112. The dimensions of the springs 83 in the capacitor assemblies 69 will vary according to the dimensions of the capacitors 111, 112, 113.

Figure 21:
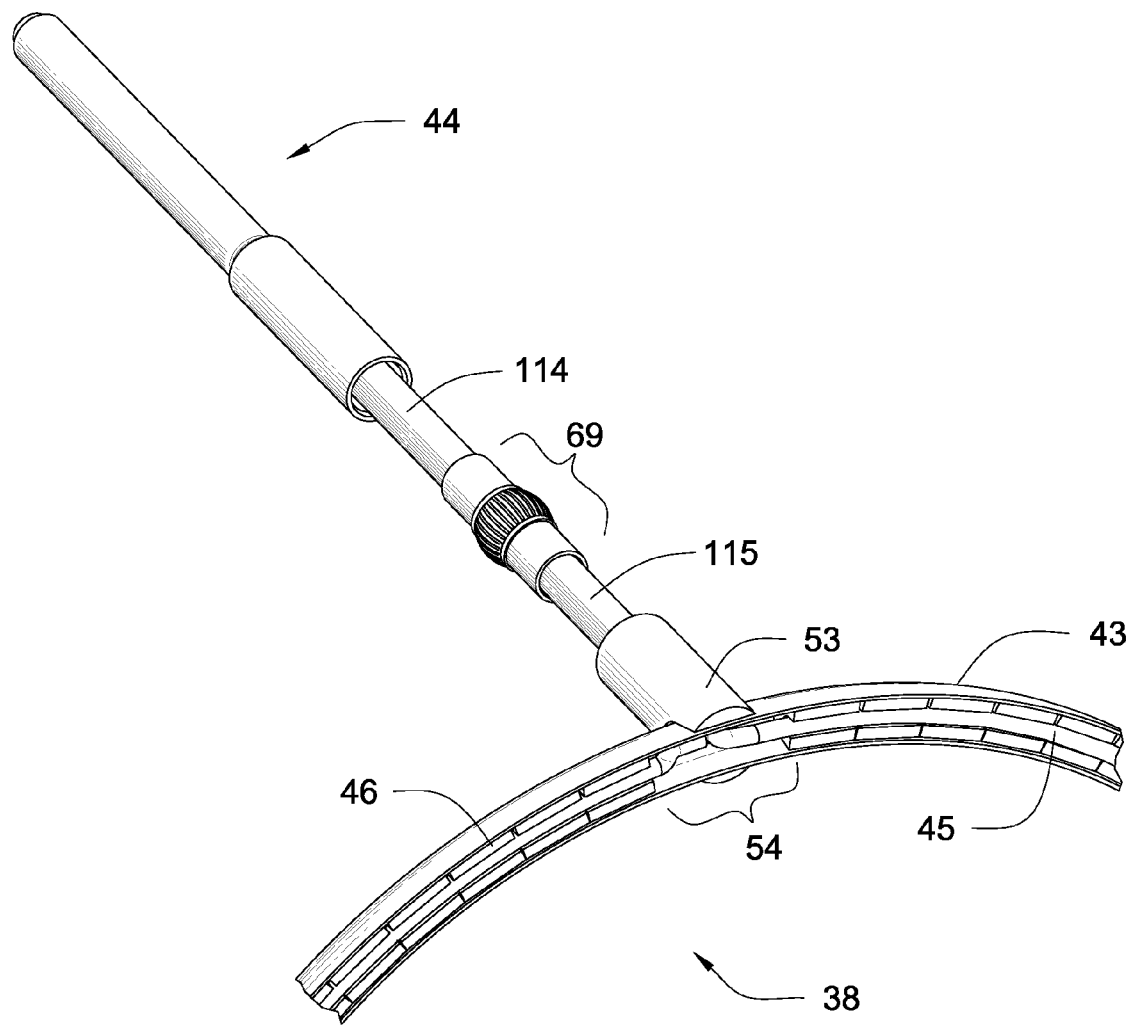
FIG. 21 is a perspective view of an embodiment of a capacitor according to an embodiment of the present invention.
Figure 22:
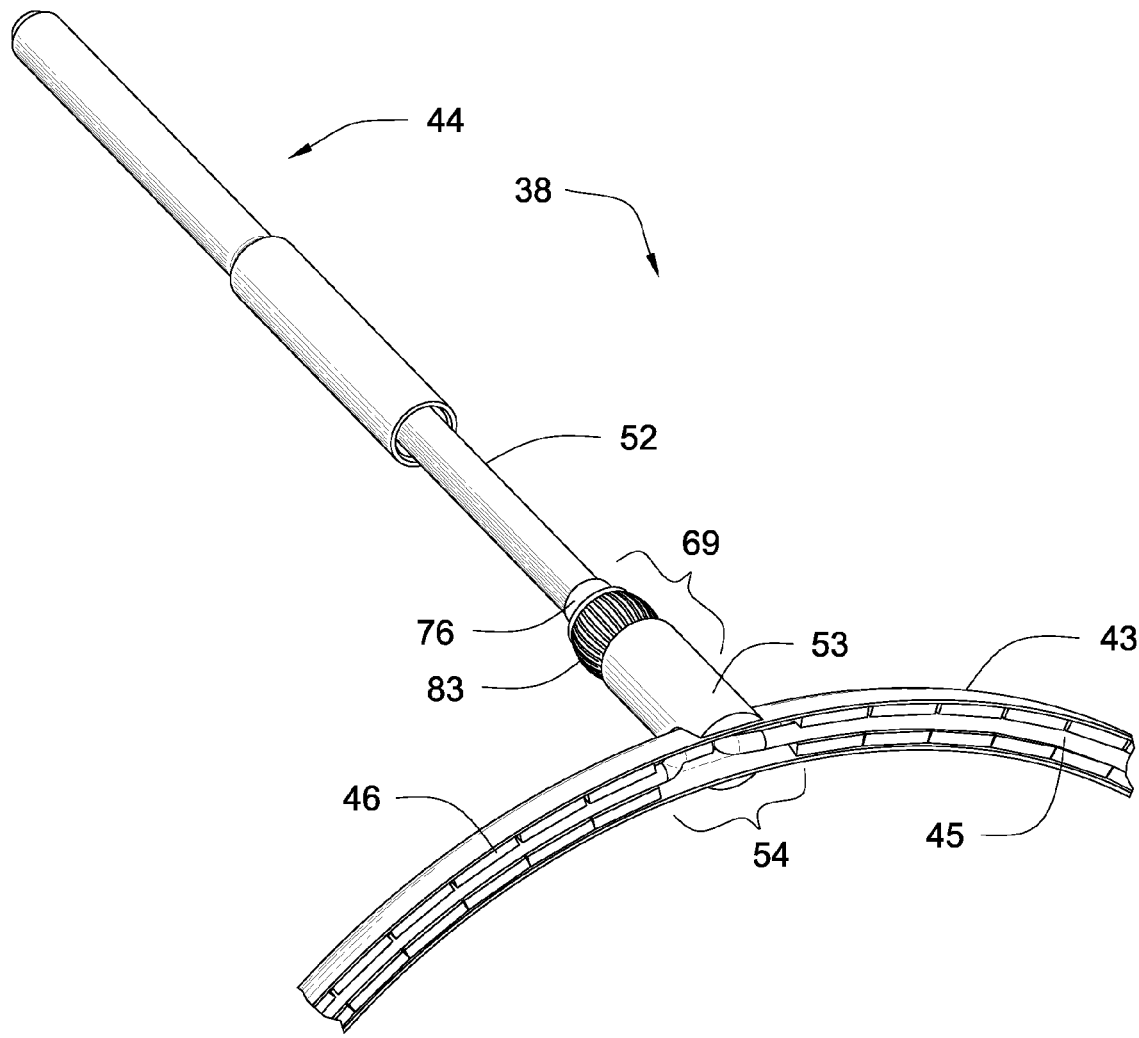
FIG. 22 is a perspective view of an embodiment of a capacitor according to an embodiment of the present invention.

In another embodiment of the present invention, the capacitor assembly 69 is disposed between a first portion 114 and a second portion 115 of a lead wire, as shown in FIG. 21. In other embodiments the capacitor assembly 69 is part of the anti-rotation device 53, as shown in FIG. 22. In this embodiment, the capacitor assembly 69 comprises a first section 76 of the connector 72, which comprises a lead wire receptacle 81. The capacitor 74 connects directly to the anti-rotation device 53.

What is claimed is:

1. A transmission system in a downhole tubular component, comprising:
    a first data transmission element disposed in a first end of a downhole component, and a second data transmission element disposed in a second end of the downhole component;
    a coaxial cable, disposed within a passage in the downhole component, comprising an outer conductor and a first and second portion of an inner conductor, wherein the first portion is in electrical communication with the first data transmission element, and the second portion is in electrical communication with the second transmission element;
    a coaxial connector adapted to electrically connect the first and second portions of the inner conductor; and
    a coaxial capacitor comprising a first and second conductor separated by a dielectric material, wherein the first conductor is electrically connected to the coaxial connector, and the second conductor is electrically connected directly to the outer conductor.

2. The transmission system of claim 1, wherein the transmission system comprises at least one inductor located on either side of the coaxial capacitor.

3. The transmission system of claim 1, wherein each of the first and second data transmission elements comprises a direct electrical coupler.

4. The transmission system of claim 1, wherein each of the first and second data transmission elements comprises an inductive coupler.

5. The transmission system of claim 4, wherein the inductive coupler houses an electrically conducting coil in MCEI material.

6. The transmission system of claim 5, wherein the MCEI material is ferrite.

7. The transmission system of claim 1, wherein the transmission system further comprises a sealing assembly mounted axially around the lead wire.

8. The transmission system of claim 1, wherein the passage is formed in the downhole component.

9. The transmission system of claim 1, wherein the passage is a metal tube.

10. The transmission system of claim 1, wherein the passage is the outer conductor of the coaxial cable.

11. The transmission system of claim 1, wherein the coaxial connector comprises a single section.

12. The transmission system of claim 1, wherein the coaxial connector comprises at least two sections.

13. The transmission system of claim 12, wherein the at least two sections are separated by a spacer.

14. The transmission system of claim 1, wherein the coaxial connector is at least partially electrically insulated.

15. The transmission system of claim 1, wherein the coaxial capacitor is axially mounted to the coaxial connector.

16. The transmission system of claim 1, wherein the coaxial capacitor comprises at least one electrically conducting spacer in electrical communication with the passage.

17. The transmission system of claim 1, wherein the coaxial capacitor comprises a coaxial spring which is disposed around the coaxial connector and provides electrical communication between the coaxial connector and the outer conductor.

18. The transmission system of claim 1, wherein at least one of the first and second transmission elements comprises an anti-rotation device coaxially mounted on a lead wire for preventing an electrically conducting coil from rotating about an axis of the lead wire.

* * * * *